(12) United States Patent
Kane et al.

(10) Patent No.: US 8,422,987 B2
(45) Date of Patent: Apr. 16, 2013

(54) PROMPTING AND DIRECTING USERS TO SAFETY DURING EMERGENCY SITUATIONS

(75) Inventors: John Richard Kane, Fox River Grove, IL (US); Andrew Aftelak, Palatine, IL (US); Farideh Gozleveli, Ft. Lauderdale, FL (US); Li-Xin Zhen, Shanghai (CN)

(73) Assignee: Motorola Solutions, Inc., Schaumburg, IL (US)

( * ) Notice: Subject to any disclaimer, the term of this patent is extended or adjusted under 35 U.S.C. 154(b) by 1054 days.

(21) Appl. No.: 11/966,143

(22) Filed: Dec. 28, 2007

(65) Prior Publication Data
US 2009/0170468 A1    Jul. 2, 2009

(51) Int. Cl.
*H04M 11/04* (2006.01)
(52) U.S. Cl.
USPC ......................................... 455/404.2; 340/690
(58) Field of Classification Search .................. 370/270; 455/404.1, 466, 404.2, 456.1; 340/690
See application file for complete search history.

(56) References Cited

U.S. PATENT DOCUMENTS

| | | | |
|---|---|---|---|
| 6,847,892 B2 | 1/2005 | Zhou et al. | |
| 7,054,612 B2 | 5/2006 | Patel | |
| 7,262,692 B2 | 8/2007 | Ho | |
| 7,924,149 B2 | 4/2011 | Mendelson | |
| 2003/0069002 A1 | 4/2003 | Hunter et al. | |
| 2003/0137415 A1 | 7/2003 | Thomson | |
| 2006/0009191 A1 | 1/2006 | Malone, III | |
| 2006/0014548 A1 | 1/2006 | Bolin et al. | |
| 2006/0052090 A1 | 3/2006 | Behr et al. | |
| 2006/0058948 A1 | 3/2006 | Blass et al. | |
| 2006/0071783 A1 | 4/2006 | Culpepper et al. | |
| 2006/0158328 A1 | 7/2006 | Culpepper et al. | |
| 2007/0049259 A1 | 3/2007 | Onishi et al. | |
| 2007/0072583 A1 | 3/2007 | Barbeau et al. | |

(Continued)

FOREIGN PATENT DOCUMENTS

| | | |
|---|---|---|
| JP | 05-298569 A | 11/1993 |
| JP | 2007-034671 A | 2/2007 |

(Continued)

OTHER PUBLICATIONS

Dong Sung Kim, "PCT International Search Report and Written Opinion," WIPO, ISA/KR, Korean Intellectual Property Office, Daejeon, Republic of Korea, May 29, 2009.

(Continued)

*Primary Examiner* — Phuoc Doan
(74) *Attorney, Agent, or Firm* — Daniel K. Nichols; Valerie M. Davis; Kenneth A. Haas (57) ABSTRACT

A method and wireless device augment and manage, respectively, emergency alert messages with additional emergency information. An emergency alert message is determined to have been sent (404) to one or more wireless devices (102) in a given area. The emergency alert message is analyzed (406) to determine a type of emergency associated with the emergency alert message. Optionally, a current location of at least one wireless device (102) within the given area is determined. A message is generated (412), based at least in part on the type of emergency and logistics of the given area, including additional emergency information for augmenting the emergency alert message. The message that has been generated is transmitted to the at least one wireless device (102). This message is, optionally, adjusted based on the location of the device and the logistics of the given area.

16 Claims, 5 Drawing Sheets

U.S. PATENT DOCUMENTS

| | | | |
|---|---|---|---|
| 2007/0182539 A1 | 8/2007 | Ho | |
| 2007/0194922 A1 | 8/2007 | Nathan et al. | |
| 2008/0055077 A1 | 3/2008 | Lane et al. | |
| 2008/0111705 A1* | 5/2008 | Lee | 340/690 |
| 2008/0291849 A1* | 11/2008 | Ostermeier et al. | 370/270 |
| 2009/0023481 A1 | 1/2009 | Foster et al. | |
| 2009/0170467 A1 | 7/2009 | Nowlan et al. | |
| 2009/0170468 A1 | 7/2009 | Kane et al. | |
| 2009/0170529 A1 | 7/2009 | Kane | |
| 2010/0001858 A1* | 1/2010 | Daly et al. | 340/540 |
| 2010/0015943 A1 | 1/2010 | Karl et al. | |

FOREIGN PATENT DOCUMENTS

| | | | |
|---|---|---|---|
| JP | 2007-087366 A | 4/2007 | |
| KR | 10-2006-0069400 A | 6/2006 | |
| KR | 10-2006-0089975 A | 8/2006 | |
| KR | 10-2007-0002502 A | 1/2007 | |
| KR | 10-2007-0024322 A | 3/2007 | |
| KR | 10-2007-0043155 A | 4/2007 | |

OTHER PUBLICATIONS

International Preliminary Report on Patentability and Written Opinion for International Patent application No. PCT/US2008/087282 mailed on Jul. 8, 2010.

International Search Report and Written Opinion for International Patent Application No. PCT/US2008/087278 mailed on May 29, 2009.

Non Final Office Action mailed on Jun. 21, 2011 in U.S. Appl. No. 11/965,204, John Richard Kane, filed Dec. 27, 2007.

Final Office Action mailed on Jan. 9, 2012 in U.S. Appl. No. 11/965,204, John Richard Kane, filed Dec. 27, 2007.

International Preliminary Report on Patentability and Written Opinion for International Patent Application No. PCT/US2008/087278 mailed on Jul. 8, 2010.

International Search Report and Written Opinion for International Patent Application No. PCT/US2008/087284 mailed on May 29, 2009.

Non Final Office Action mailed on Sep. 17, 2010 in U.S. Appl. No. 11/966,536, Steve J. Nowlan, filed Dec. 28, 2007.

Notice of Allowance mailed on Feb. 22, 2011 in U.S. Appl. No. 11/966,536, Steve J. Nowlan, filed Dec. 28, 2007.

International Preliminary Report on Patentability and Written Opinion for International Patent Application No. PCT/US2008/087284 mailed on Jul. 8, 2010.

* cited by examiner

PROMPTING AND DIRECTING USERS TO SAFETY DURING EMERGENCY SITUATIONS

CROSS-REFERENCE TO RELATED APPLICATIONS

This application is related to co-pending U.S. patent application Ser. No. 11/965,204 filed on Dec. 27, 2007, and entitled "EMERGENCY EXIT ROUTING USING WIRELESS DEVICES DURING EMERGENCY SITUATIONS"; the entire disclosure of the above-identified application being hereby incorporated by reference.

FIELD OF THE INVENTION

The present invention generally relates to the field of emergency alerts, and more particularly relates to augmenting emergency alerts with emergency exit location information provided on a wireless device.

BACKGROUND OF THE INVENTION

Emergency alert systems are used to communicate vital information to the public during emergency situations. This information is generally conveyed to the public via televisions or public addressing systems. Refinements of emergency alert systems provide an emergency alert notification message to specific locations, but fail to dynamically supply local contextually important information to particular recipients of the message.

For example, U.S. Pre-Grant Publication No. 2003/0069002 discusses a system that delivers notification content to multiple users. In particular, this system delivers emergency notification content from a message originating source to one or more transmitting sources. A subset of potential recipients is then selected based on the subject of the notification and the notification content is then delivered to a device associated with each such recipient. While the location of the recipient may be known, the message content is not altered based on that knowledge.

U.S. Pre-Grant Publication No. 2003/0137415 discusses a system that communicates safety information from a centralized monitoring service (e.g., 911 dispatcher) to affected areas. A central device encodes the message and transmits it to one or more receiving devices at different locations. Notification messages may be tailored to the locations that are being addressed, i.e., different notifications based on location of the receiving device. However, devices in this system are at fixed locations.

As can be appreciated from the discussion above, conventional emergency alert systems may generally have sent notification messages to recipients to alert them of an emergency situation, but have failed to provide local contextually important information to particular recipients of the messages.

Therefore a need exists to overcome the problems with the prior art as discussed above.

SUMMARY OF THE INVENTION

Briefly, in accordance with the present invention, disclosed is a method for augmenting emergency alert messages with additional emergency information. The method includes determining that an emergency alert message has been sent to one or more individuals possessing wireless devices in a given area. The emergency alert message is analyzed to determine a type of emergency associated with the emergency alert message. Optionally, a current location of at least one wireless device within the given area is determined A message is generated, based at least in part on the type of emergency and logistics of the given area, including additional emergency information for augmenting the emergency alert message. The message that has been generated is transmitted to the at least one wireless device. This message will, optionally, be adjusted based on the location of the device and the logistics of the given area.

In another embodiment a method for managing augmented emergency alert messages is disclosed. An emergency alert message is received from at least one emergency notification device. An augmenting message is received from at least one emergency notification augmenting device. The augmenting message comprises additional emergency information associated with the emergency alert message. The augmenting message is analyzed. A user is directed to an exit based at least in part on the additional emergency information from the augmenting message.

In yet another embodiment, a wireless device for managing augmented emergency alert messages is disclosed. The wireless device includes a memory and a processor that is communicatively coupled to the memory. The wireless device also includes a user interface that is communicatively coupled to the memory and the processor. An emergency alert manager is communicatively coupled to the memory, processor, and user interface. The emergency alert manager is adapted to receive an emergency alert message from at least one emergency notification device. An augmenting message is received from at least one emergency notification augmenting device. The augmenting message comprises additional emergency information associated with the emergency alert message. The augmenting message is analyzed. A user is directed to an exit based at least in part on the additional emergency information from the augmenting message.

An advantage of the foregoing embodiments is that an emergency alert message can be augmented with device specific information. For example, a local or national emergency alert message can be transmitted to a wireless device for evacuating a building. Local augmenting notification devices can detect and analyze the emergency alert message and augment the alert message with device or locality logistics specific information such as routing information. This routing information helps a user navigate to a safe area during the emergency situation. Another advantage is that a user can provide feedback to the augmenting notification devices to obtain even more specific routing information.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, and other similar devices.

General Operating Environment

Figure 1:
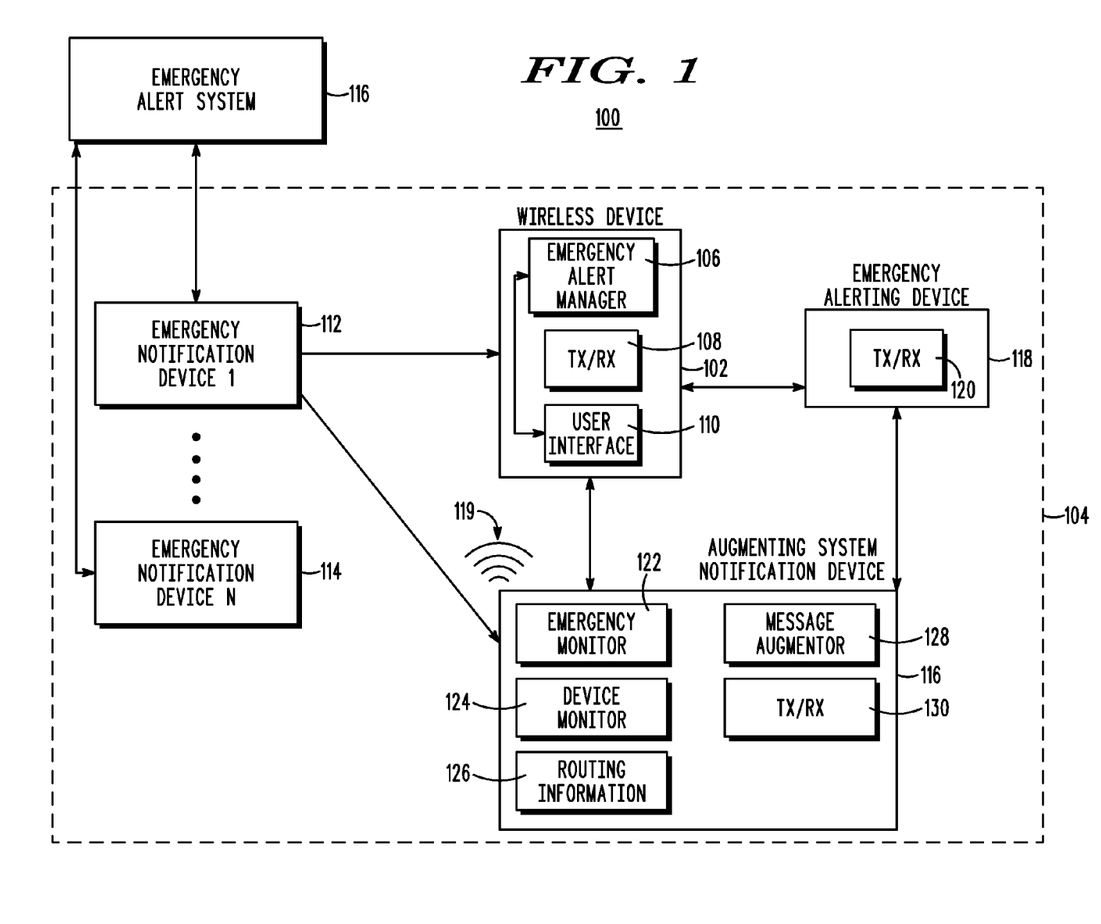
FIG. 1 is block diagram illustrating a general operational environment, according to one embodiment of the present invention.

According to one embodiment of the present invention as shown in FIG. 1 a general operating environment 100 for implementing one or more embodiments of the present invention is illustrated. In particular, FIG. 1 shows one or more wireless devices 102 within a structure 104 such as an office building, shopping center, hospital, hotel, stadium, cruise ship, hurricane shelter, tornado shelter, or any other type of structure. It should be noted that although FIG. 1 shows a structure 104, the various embodiments of the present invention are also applicable to open environments as well. For example, the present invention is also applicable to environments such as (but not limited to) outdoor shopping centers, amusement parks, parks, or any other open environment. Each wireless device 102 includes an emergency alert manager 106, a transceiver 108, and a user interface 110. Each of these components is discussed in greater detail below.

The environment 100 also includes one or more emergency notification devices 112, 114 that are communicatively coupled to an Emergency Alert System 116. The Emergency Alert System 116 generates emergency alerts on a national, state, or local government level. The emergency notification devices 112, 114 receive the alerts from the Emergency Alert System 116 via one or more particular communication channel(s) and send a corresponding alert to the wireless device 102. It should be noted that the emergency notification devices 112, 114 can also be communicatively coupled to a local emergency alerting system for the structure such as a fire alarm system, biological pollutant alerting system, or other types of alerting systems. The emergency notification devices 112, 114, in one embodiment, can be a public addressing system or an emergency alerting system that can send emergency alerts to wireless devices 102.

FIG. 1 also shows an augmenting notification system ("ANS") 116 that is communicatively coupled to the wireless device 102 and the emergency notification devices 112, 114. The ANS 116, in one embodiment, is communicatively coupled to one or more optional emergency alerting devices ("EAD") 118 such as those discussed in the co-pending application entitled "EMERGENCY EXIT ROUTING USING WIRELESS DEVICES DURING EMERGENCY SITUATIONS", application Ser. No. 11/965,204 filed on Dec. 27, 2007, and which is commonly assigned herewith to Motorola, Inc., and which is hereby incorporated by reference in its entirety. The EAD 118 can be mechanically and communicatively coupled to an emergency exit, smoke detector, heat detector, air quality detector, emergency lighting system, or any other emergency system/component within the structure 104. The EAD 118 includes a transceiver 120 for generating an emergency beacon, which is discussed in greater detail below. The ANS 116, in one embodiment, includes an emergency monitor 122, a device monitor 124, routing information 126, a message augmenter 128, and a transceiver 130. Each of these components is discussed in greater detail below.

Augmenting Emergency Alert Messages

During times of an emergency such as a fire, hurricane, tornado, blackout, national emergency, or any other type of emergency or critical situation, the Emergency Alert System 116 sends out an emergency alert signal to the emergency notification devices 112, 114. Alternatively, the emergency notification devices 112, 114 can generate their own emergency alert signal.

The emergency notification devices 112, 114 then transmit an emergency alert message to each wireless device 102 within a given area. This message can be directed to an individual device or broadcasted (e.g., via a public addressing system) as audio transmissions to all individuals holding wireless devices or broadcast as messages to all wireless devices. For purposes of this discussion, the emergency alert message, in our embodiment, is a message to evacuate the structure 104. However, any type of emergency alert message can be transmitted to the wireless devices via the emergency notification devices 112, 114.

The emergency monitor 122 in the ANS 116 determines that an emergency alert has been sent out to wireless devices in its coverage area. The ANS 116 can identify the wireless devices 102 in its coverage area via its device monitor 124. For example, the device monitor 124 via the transceiver 130 detects wireless signals emitted from the wireless devices 102 from their transceivers 108 and stores the unique identifier of the wireless device in memory. The transceiver 130, 108 of the ANS 116 and a wireless device 102 can utilize various technologies such as Bluetooth, Zigbee, or any other short range or long range radio technology.

The message augmenter 128 of the ANS 116 analyzes the alert message sent out to the wireless devices 102 by the emergency notification device 112, 114 and creates one or more additional messages 119 to supplement the emergency alert message. For example, the ANS 116, in one embodiment, tracks each recipient wireless device 102 and augments the emergency alert message with a signal 119 that causes the wireless device to emit audio beeping or backlight flashing that becomes more rapid as the recipient device 102 approaches an exit. The beep or flash rate can be indicative of a direction to follow. This embodiment is advantageous because it helps a user identify and locate an exit or safe passage. The augmented information can be based on logistics of the area where the wireless devices 102 are located. Logistics during an emergency situation refer to the evacuation or movement of individuals to safety.

In another embodiment, the ANS 116 selects various wireless devices 102 and sends a signal 119 to these devices for flashing their backlights to mark a path towards an exit. The ANS 116 can also augment the emergency alert message received by a wireless device 102 with critical information such as emergency exit/evacuation routing information. For example, the ANS 116 can determine a routing strategy for the wireless device 102 using its internal routing information 126. The internal routing information 126 comprises a plurality of routing plans that can be used by the ANS 116 for directing a wireless device 102 to an emergency exit. For example, the device monitor 124 can determine a current location of the wireless device 102 or whether the device is moving closer to or away from an exit using a variety of positioning methods. For example, the ASN 116 can utilize GPS technology or monitor signal strength.

Once the routing plan is determined the ANS 116 generates a message 119 via its message augmenter 128 to transmit out to the wireless device 102. The message 119 can include routing information such as head east; turn left in 20 feet; continue your current direction; information regarding the emergency; current location information with respect to the nearest emergency exit; emergency safety tips; or other similar information. The message is transmitted to the wireless device 102 via the transceiver 130. The message type can be (but is not limited to) a text message, a multimedia message, an email, an automated message, or any other similar messaging types. The messages include text, pictures, voice prompts, and other visual and audio indicators.

Alternatively, the ANS 116 can augment an emergency alert message with a pre-programmed route to an exit. For example, the ANS routing information 126 can include pre-programmed routes such as a first floor exit plan, a second floor exit plan, and other similar routes. The ANS 116 transmits the appropriate information to each wireless device 102 based on what floor they are on. The ANS 116 can also send general exit routes that include all of the routes for the entire building. The user is then able to determine what route is appropriate for him/her. Also a user, in one embodiment, can send position information to the ANS 116 and receive an exit route back from the ANS 116 based on the transmitted position information.

Figure 2:
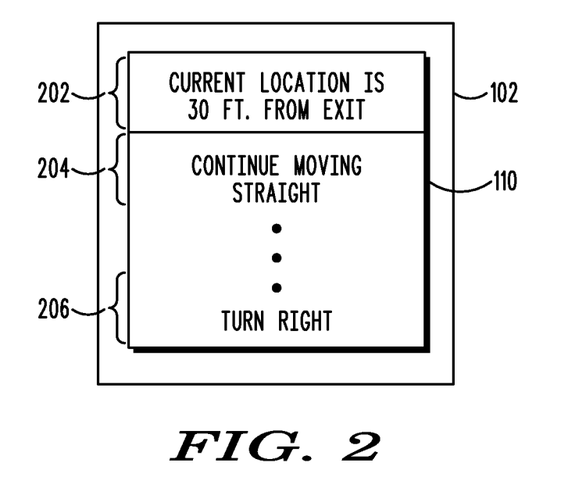
FIGS. 2-3 are examples of augmented information for an emergency alert message provided to a user via a user interface according to one embodiment of the present invention.

Once the wireless device 102 receives the augmented message 119 from the ANS 116 and the based on the message 119, the emergency alert manager 106 within the device 102 displays the information within the message 119 from the ANS 116 to the user via the user interface 110. The user is then able to follow the routing directions to the nearest or safest exit. For example, FIG. 2 shows one example of the user interface 110 of the wireless device 102 displaying routing information received from the ANS 116. In particular, FIG. 2 shows information 202 such as the current location with respect to the nearest or safest exit. FIG. 2 also shows that the information can change as the user moves. For example, a first routing prompt 204 tells the user to keep moving straight or in the current direction. As the user moves, a second prompt 206 tells the user to turn right.

Figure 3:
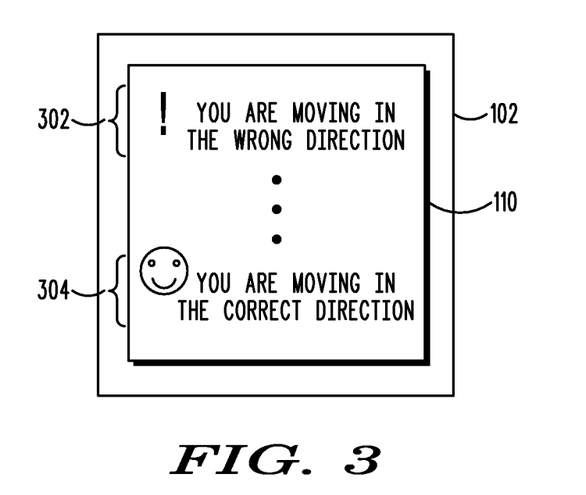

FIG. 3 shows another example of displaying prompts on the user interface 110 to a user. In particular, FIG. 3 shows a first prompt 302 that notifies the user that he/she is moving in the wrong direction with respect to the nearest or safest exit. FIG. 3 also shows a second prompt 304 that notifies the user when he/she is moving in the correct direction with respect to the nearest or safest exit. The user can use these prompts to locate the direction with respect to the nearest or safest exit.

In another embodiment, local beacons or data streams generated by the EADs 118 are used to augment the emergency alert message. Such beacons are located, in one embodiment, at the exits of the structure 104. In other words, the ANS 116 can communicate with the EADs 118 so that they generate their beacon signal or the ANS 116 can notify the wireless device 102 to monitor the beacon signal. The EADs 118 can also generate their beacon signal based on detecting an emergency condition. For example, when a fire alarm sounds, an emergency exit is opened, or emergency lights are activated, the EADs 118 generate their emergency beacons. In this embodiment, the wireless devices 102 monitor the signal strength between itself and the EAD 118 to find an optimal path to safety. For example, a decreasing signal indicates the device is moving away from the exit and an increasing signal indicates the device is moving towards the exit. As discussed above, the ANS 116 can variably control audio and visual indicators on the wireless device 102 to notify the user whether he/she is getting closer or farther away from an exit.

As can be seen, the various embodiments of the present invention are advantageous because an emergency alert message can be augmented with critical exit route information and displayed on a wireless device. Also, visual and audio indicators can be sent or activated on a wireless device to help a user find an exit or safe pathway.

Process for Augmenting Emergency Alert Messages with Exit Routing Information

Figure 4:
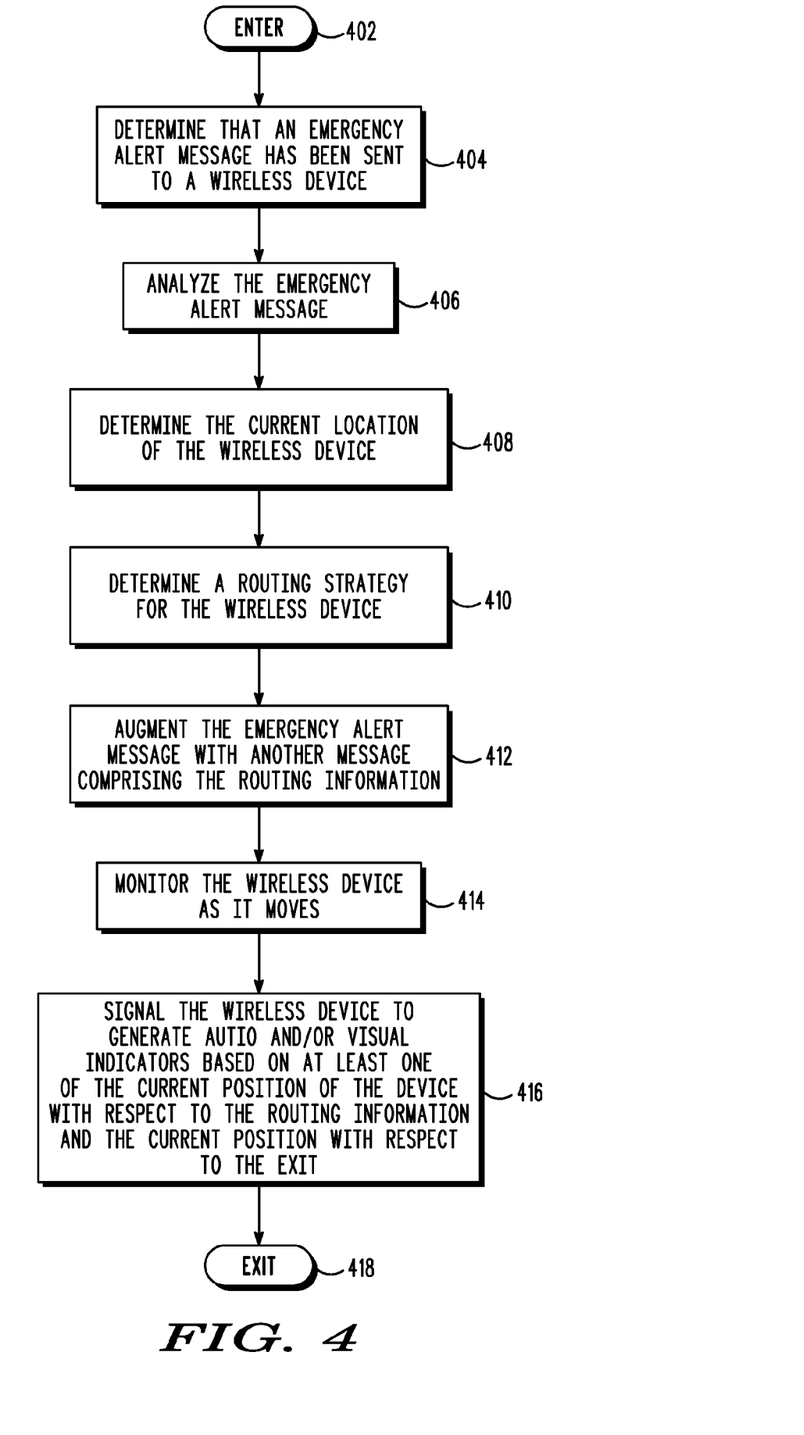
FIG. 4 is an operational flow diagram illustrating a process of augmenting emergency alert messages sent to a wireless device with exit routing information according to one embodiment of the present invention.

FIG. 4 is an operational flow diagram illustrating a process augmenting emergency alert messages sent to a wireless device with exit routing information. The operational flow diagram of FIG. 4 begins at step 402 and flows directly to step 404. The ANS 116, at step 404, determines that an emergency alert message has been sent to a wireless device 102. The ANS 116, at step 406, analyzes the emergency alert message.

The ANS 116, at step 408, determines the current location of the wireless device 102 using signal strength information, GPS information, user supplied information, or any other wireless device location mechanism. A routing strategy for the wireless device 102, at step 410, is determined. For example, the ANS 116 analyzes its routing information 126 to determine the best route or a pre-programmed route to send to the device to get the user to an exit.

The ANS 116, at step 412, augments the emergency alert message with another message 119 that includes the routing information. As discussed above, the routing information can be a dynamically generated route that has been generated based on the current position of the device 102. The routing information can also be a pre-programmed route or augmented with an emergency beacon generated by the EAD 118. The ANS 116, at step 414, monitors the wireless device 102 as it moves about its location. The ANS 116, at step 416, signals the wireless device 102 to generate audio and/or visual indicators based on at least one of the current position of the device 102 and the routing information and the current position and the exit. For example, the ANS 116 can signal the device to increase backlight flashes as the device is getting near an exit or increase audio beeps when the device is near a turn according to the routing information. The control flow then exits at step 418.

Wireless Device

Figure 5:
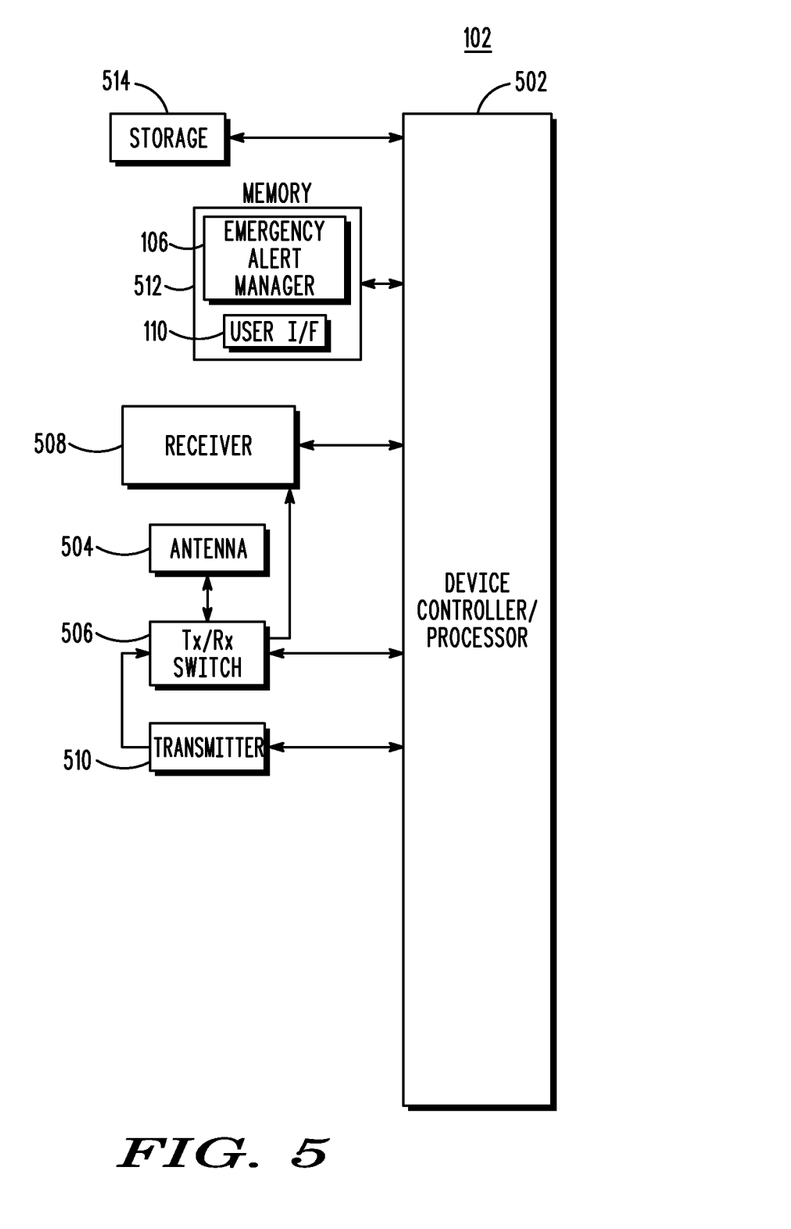
FIG. 5 is a block diagram illustrating a detailed view of a wireless device according to one embodiment of the present invention.

FIG. 5 is a block diagram illustrating a detailed view of the wireless device 102 according to one embodiment of the present invention. It is assumed that the reader is familiar with wireless communication devices. To simplify the present description, only that portion of a wireless communication device that is relevant to the present invention is discussed. The wireless device 102 operates under the control of a device controller/processor 502, that controls the sending and receiving of wireless communication signals. In receive mode, the device controller 502 electrically couples an antenna 504 through a transmit/receive switch 506 to a receiver 508. The receiver 508 decodes the received signals and provides those decoded signals to the device controller 502.

In transmit mode, the device controller 502 electrically couples the antenna 504, through the transmit/receive switch 506, to a transmitter 510. The wireless device 102 can also include an additional transceiver 108 as discussed above. However, the receiver 508/transmitter 510 can also provide the functionality of the transceiver 108 discussed above. The wireless device 102 also includes volatile memory 512 and non-volatile storage memory 514. Either of these memories 512, 514 can include the emergency alert manager 106 and the software components of user interface 110. Each of these components has been discussed above in greater detail.

Information Processing System

Figure 6:
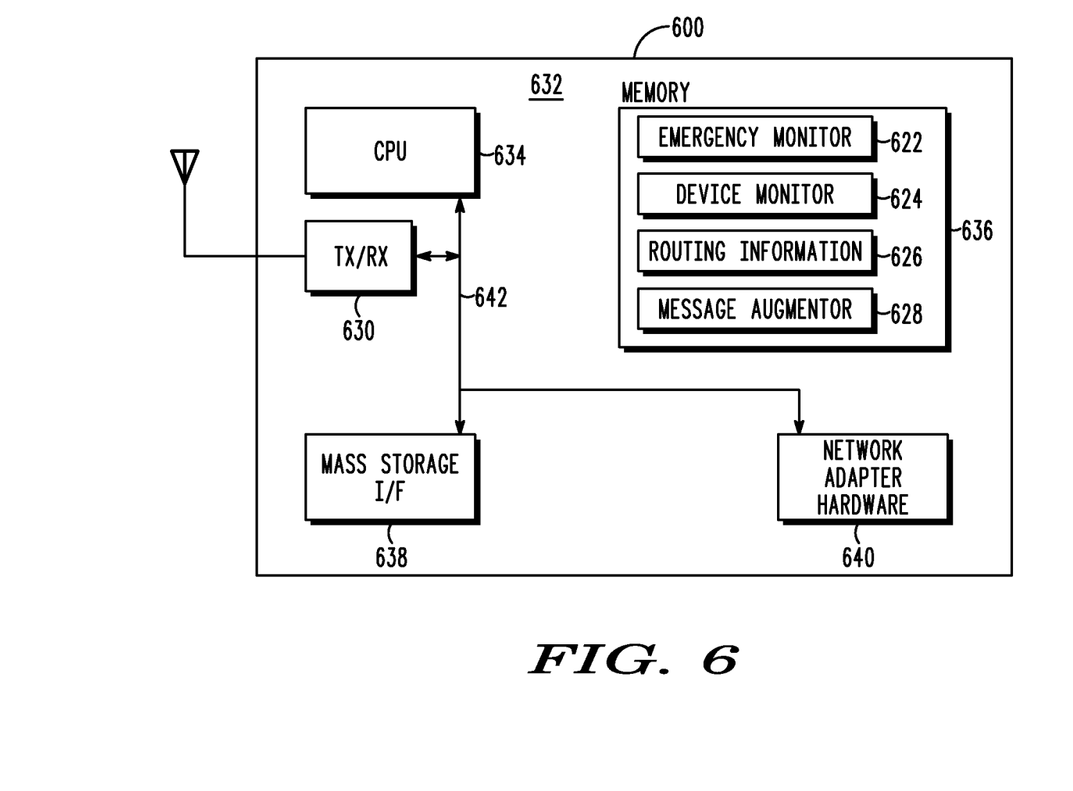
FIG. 6 is a block diagram illustrating a detailed view of an information processing system according to one embodiment of the present invention.

FIG. 6 is a block diagram illustrating a detailed view of an information processing system 600 such as the ANS system 116 discussed above. The information processing system 600 includes a computer 632. The computer 632 has a processor 634 that is connected to a main memory 636, a transceiver 630, a mass storage interface 638, and network adapter hardware 640. A system bus 642 interconnects these system components. The mass storage interface 638 is used to connect mass storage devices, such as a data storage device to the information processing system 600.

The main memory 636, in one embodiment, includes an emergency monitor 622, a device monitor 624, routing information 626, and a message augmenter 628, which have discussed above in greater detail. The network adapter hardware 640 is used to provide an interface to a network (not shown). Various embodiments of the present invention can be adapted to work with any data communications connections including present day analog and/or digital techniques or via a future networking mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for augmenting emergency alert messages with additional emergency information, the method comprising:
    determining, by an augmenting notification system, that an emergency alert message has been sent to at least one wireless device in a given area;
    analyzing, by the augmenting notification system, the emergency alert message to determine a type of emergency associated with the emergency alert message;
    generating, by the augmenting notification system, an augmented emergency alert message, based at least in part on the type of emergency and logistics of the given area, comprising the additional emergency information including directional prompts indicating a direction to follow towards an exit;
    transmitting, by the augmenting notification system, the message that has been generated to the at least one wireless device;
    instructing, by the augmenting notification system, the at least one wireless device to monitor transmissions from at least one emergency beacon generating device by a set of signals that provide a set of varying feedback to the at least one wireless device based on a current location of the at least one wireless device;
    wherein the set of varying feedback comprises at least one of:
    flashing lights at the at least one wireless device;
    changing text at the at least one wireless device;
    audio prompts at the at least one wireless device; and
    tactile prompts at the at least one wireless device.

2. The method of claim 1, further comprising:
    determining, by the augmenting notification system, a current location of the at least one wireless device within the given area.

3. The method of claim 2, wherein determining a current location of the at least one wireless device within a given area further comprises at least one of:
    determining, by the augmenting notification system, location coordinates associated with the at least one wireless device;
    determining, by the augmenting notification system, a location based on a monitored signal strength of a signal associated with the at least one wireless device; and
    receiving, by the augmenting notification system, positioning information from the at least one wireless device.

4. The method of claim 1, wherein the determining that an emergency alert message has been sent to the at least one wireless device further comprises at least one of:
    detecting, by the augmenting notification system, an emergency notification signal from an emergency notification device; and
    determining, by the augmenting notification system, that an emergency beacon has been generated at an emergency beacon generating device.

5. The method of claim 1, wherein generating a message further comprises:
    determining a route to the exit.

6. The method of claim 5, wherein the route is one of:
    a pre-programmed route; and
    a route determined based on a current location of the at least one wireless device.

7. A method, with a wireless device, for managing augmented emergency alert messages, the method comprising:
    receiving, by the wireless device, an emergency alert message from at least one emergency notification device;
    receiving, by the wireless device, an augmenting message from at least one emergency notification augmenting device, wherein the augmenting message comprises additional emergency information associated with the emergency alert message;
    analyzing, by the wireless device, the augmenting message; and
    providing directional prompts, by the wireless device, indicating a direction to follow towards an exit based on the additional emergency information;
    wherein providing the directional prompts indicating the direction to follow towards the exit based on the additional emergency information, further comprises:
    determining a current location of the wireless device;
    comparing the current location of the wireless device with directional information included within the additional emergency information; and providing the wireless device with the directional prompts based on the comparing.

8. The method of claim 7, further comprising:
establishing, by the wireless device, a short range radio frequency communication link with the at least one emergency notification augmenting device.

9. The method of claim 7, wherein the additional emergency information comprises directional information associated with an exit, wherein the directional information is used by the wireless device for providing the directional prompts indicating the direction to follow towards the exit.

10. The method of claim 7, wherein the directional prompts include at least one of:
audio prompts;
visual prompts; and
tactile prompts.

11. The method of claim 7, wherein the additional emergency information includes instructions to monitor transmissions from at least one emergency beacon generating device, and wherein providing the directional prompts indicating the direction to follow towards the exit based on the additional emergency information further comprises:
monitoring, by the wireless device, the at least one emergency beacon to determine if a signal strength associated with the at least one emergency beacon is one of decreasing and increasing,
wherein if the signal strength associated with the at least one emergency beacon is decreasing,
prompting, by the wireless device, to change a current direction of movement; and
wherein if the signal strength associated with the at least one emergency beacon is increasing,
prompting, by the wireless device, to continue heading in a current direction.

12. A wireless device for managing augmented emergency alert messages, the wireless device comprising:
a memory;
a processor communicatively coupled to the memory;
a user interface communicatively coupled to the memory and the processor; and
an emergency alert manager communicatively coupled to the memory, the processor, and the user interface, wherein the emergency alert manager is configured to:
receive an emergency alert message from at least one emergency notification device;
receive an augmenting message from at least one emergency notification augmenting device, wherein the augmenting message comprises additional emergency information associated with the emergency alert message;
analyze the augmenting message; and
provide directional prompts, via the user interface, indicating a direction to follow towards an exit based on the additional emergency information;
wherein the emergency alert manager is further configured to provide the directional prompts indicating the direction to follow towards the exit based on the additional emergency information by:
determining a current location of the wireless device;
comparing the current location of the wireless device with directional information included within the additional emergency information; and
providing the directional prompts based on the comparing.

13. The wireless device of claim 12, wherein the emergency alert manager is further configured to:
establish a short range radio frequency communication link with the at least one emergency notification augmenting device.

14. The wireless device of claim 12, wherein the additional emergency information comprises directional information associated with an exit, wherein the directional information is used by the emergency alert manager for providing the directional prompts indicating the direction to follow towards the exit.

15. The wireless device of claim 12, wherein the directional prompts include at least one of:
audio prompts;
visual prompts; and
tactile prompts.

16. The wireless device of claim 12, wherein the additional emergency information includes instructions to monitor transmissions from at least one emergency beacon generating device, and wherein the emergency alert manager is further configured to provide the directional prompts indicating the direction to follow towards the exit based on the additional emergency information by:
monitoring the at least one emergency beacon to determine if a signal strength associated with the at least one emergency beacon is one of decreasing and increasing,
wherein if the signal strength associated with the at least one emergency beacon is decreasing,
prompting to change a current direction of movement; and
wherein if the signal strength associated with the at least one emergency beacon is increasing,
prompting to continue heading in a current direction.

* * * * *